United States Patent [19]

Elliott et al.

[11] Patent Number: 5,451,951
[45] Date of Patent: Sep. 19, 1995

[54] METHOD OF, AND SYSTEM FOR, CODING ANALOGUE SIGNALS

[75] Inventors: Patrick W. Elliott; Timothy J. Moulsley, both of Surrey, Great Britain

[73] Assignee: U.S. Philips Corporation, New York, N.Y.

[21] Appl. No.: 988,934

[22] PCT Filed: Sep. 25, 1991

[86] PCT No.: PCT/NL91/00200
 § 371 Date: Apr. 9, 1993
 § 102(e) Date: Apr. 9, 1993

[87] PCT Pub. No.: WO92/06470
 PCT Pub. Date: Apr. 16, 1992

[30] Foreign Application Priority Data
 Sep. 28, 1990 [GB] United Kingdom ............. 9021103.8
 Jun. 5, 1991 [GB] United Kingdom ............. 9112143

[51] Int. Cl.⁶ .............................................. H03M 1/12
[52] U.S. Cl. ........................................ 341/155; 341/106
[58] Field of Search ............... 341/155, 106, 107, 118, 341/94; 381/36, 35, 30, 41–46

[56] References Cited

U.S. PATENT DOCUMENTS 4,963,034 10/1990 Cuperman et al. .
4,979,213 12/1990 Nitta .
5,007,092 4/1991 Galand et al. .

FOREIGN PATENT DOCUMENTS 296763 12/1988 European Pat. Off. .
2235354 2/1991 United Kingdom .

OTHER PUBLICATIONS

Adoul, P. Mabi Lleau et al., "Fast CELP Coding Based on Alegebraic Codes", International Conference on Acoustics, 1987, pp. 1957–1960.

Primary Examiner—Brian K. Young
Attorney, Agent, or Firm—David R. Treacy

[57] ABSTRACT

In a code excited linear prediction (CELP) analog signal coding system sequences from a master codebook (40), which may be a one dimensional codebook, are filtered (42) and then stored in slave codebooks (70,72). Input analog siganls (20) are filtered (34,36) and compared orthogonally (66,78,80) with sequences from the slave codebooks and an optimum pair of sequences are selected. Reduced length sequences from the master codebook may be compared with orthogonalized analog signals since orthogonalized siganls contain some redundancy.

12 Claims, 7 Drawing Sheets

$$E = \sum_{n=1}^{N} [E1(n) - G_o \cdot c^i(n) - G_e \cdot c^j(n)]^2 \qquad (1)$$

$$E_o = 2 \sum_{n=1}^{N/2} [o(n) - G_o \cdot c^i(n)]^2 \qquad (2)$$

$$G_o = \frac{\sum_{n=1}^{N/2} o(n) \cdot c^i(n)}{\sum_{n=1}^{N/2} [c^i(n)]^2} \qquad (3)$$

$$E_o = 2 \sum_{n=1}^{N/2} [o(n)]^2 - 2 \frac{\left[\sum_{n=1}^{N/2} o(n) \cdot c^i(n)\right]^2}{\sum_{n=1}^{N/2} [c^i(n)]^2} \qquad (4)$$

$$E_e = 2 \sum_{n=1}^{N/2} [e(n)]^2 - 2 \frac{\left[\sum_{n=1}^{N/2} e(n) \cdot c^j(n)\right]^2}{\sum_{n=1}^{N/2} [c^j(n)]^2} \qquad (5)$$

FIG. 9

$$E2 = 2\sum_{n=1}^{N/2} [\{o(n) - s^i G c^i(n)\} + \{e(n) - s^j G c^j(n)\}]^2 \quad (6)$$

$$G = \frac{s^i \sum_{n=1}^{N/2} o(n) c^i(n) + s^j \sum_{n=1}^{N/2} e(n) c^j(n)}{\sum_{n=1}^{N/2} [c^i(n)]^2 + \sum_{n=1}^{N/2} [c^j(n)]^2} \quad (7)$$

$$s^i \sum_{n=1}^{N/2} o(n) c^i(n) > 0 \quad (7a)$$

$$s^j \sum_{n=1}^{N/2} e(n) c^j(n) > 0 \quad (7b)$$

$$E2 = \sum_{n=1}^{N} [El(n)]^2 - 2 \frac{\left[s^i \sum_{n=1}^{N/2} o(n) c^i(n) + s^j \sum_{n=1}^{N/2} e(n) c^j(n)\right]^2}{\sum_{n=1}^{N/2} [c^i(n)]^2 + \sum_{n=1}^{N/2} [c^j(n)]^2} \quad (8)$$

$$c(n) = s^i G c^i(n) + s^j G c^j(n) \quad n=1,N \quad (9)$$

FIG. 10

METHOD OF, AND SYSTEM FOR, CODING ANALOGUE SIGNALS

TECHNICAL FIELD

The present invention relates to a method of, and system for, the coding of analogue signals having particular, but not exclusive, application to a low bit-rate speech coder for use in telecommunications. The present invention also relates to a corresponding method of, and system for, re-synthesising a perceptually close replica of the analogue signals originally coded.

BACKGROUND ART

For convenience of description the invention will be described with reference to a speech codec (coder-decoder) but the invention is also applicable to the coding and re-synthesising of other types of analogue signals, for example video. Digital techniques for the coding of speech are growing in popularity for a number of reasons, notably flexibility, cost and robustness to noise. One such technique is called Code Excited Linear Prediction (CELP) wherein the incoming speech signal is sampled, segmented into frames and encoded using a process which involves comparing it with sequences taken from a known codebook. The index number of the codebook sequence that provides the best match to each frame of the incoming speech is then stored or transmitted together with some gain and filter parameters. This type of coder belongs to the class of analysis by synthesis coders, so named since they synthesise a large number of possible matches for the signal to be coded and then use comparison techniques to analyse the incoming signal. The corresponding decoder or re-synthesiser will generally include a synthesis section similar to that of the coder.

"Fast CELP coding based on algebraic codes" by J-P. Adoul, P. Mabilleau, M. Delprat and S. Morissette, read at the International Conference on Acoustics, Speech and Signal Processing (ICASSP) 1987, pages 1957–1960 discloses a simple CELP speech coding system which is described briefly here.

The output of a source of original speech is fed to a sampling and segmentation means which quantises the speech at an appropriate sampling rate such as 8 kHz and segments it into frames with a length of, for example, 5 ms. The output of the segmentation means comprises sampled, segmented speech which is fed to a non-inverting input of a summer and to a Linear Predictive Coder (LPC). The LPC derives a set of filter coefficients relating to the short term redundancy in the incoming speech signal.

A two-dimensional codebook contains K stochastic sequences of sampled white Gaussian noise, each of length N samples. The frames of sampled speech from the segmentation means also have a length of N samples. The codebook sequences are referred to as $c^k(n)$, where k is the codebook index and n is the particular sample number within a given sequence number k. The selected output sequence $c^k(n)$ is fed to a gain stage having a gain G which gain is derived mathematically for each block of the sampled speech and each codebook sequence. The output of the gain stage is filtered successively in a long term filter and a short term filter. The long term filter usually has only one tap and a relatively long delay that is usually greater than the length of the frames of sampled speech. The purpose of the long term filter is to impose some long term order upon the codebook sequence and since the frequency of this long term order is more often than not the pitch of the speech being synthesised, this filter is also referred to as the pitch predictor. The transfer function of the long term filter is $1/B(z)$ and the filter coefficient may be derived by an adaptive loop or by analysis of the incoming speech signal. The short term filter has much shorter delays but a much larger number of taps (typically 10 to 20) than the long term filter. The purpose of the short term filter is to impose some short term order upon the codebook sequence which results, in real speech, from the speaker's vocal tract and so this filter is often referred to as the vocal tract filter. The transfer function of this filter is $1/A(z)$ and the filter coefficients are supplied to the filter by the LPC. The output of the short term filter is a synthetic speech signal which is fed to an inverting input of the summer. The output of the summer is an error signal formed by the difference between the input speech segment and the filtered codebook sequence currently under test. The error signal is fed to a perceptual weighting filter to weight the error signal in relation to the way that a human ear perceives a speech signal, so that errors in parts of the frequency spectrum to which the human hearing process is more sensitive are de-emphasised by the coder. The output of the perceptual weighting filter is fed to a Mean Square Error (MSE) calculating means to produce a MSE output signal. The MSE means squares the perceptually weighted error for each sample within a frame of speech and sums the squared errors over the length of a frame. All K sequences from the codebook are filtered and compared with the frame of incoming speech and the MSE means maintains a record of the codebook sequence and the corresponding gain parameter that result in the lowest mean square error for each complete frame of incoming speech. The index of the optimum codebook sequence $c^k(n)$, the gain of the gain stage and the filter coefficients represent a synthetic speech signal that can be reconstructed using a corresponding re-synthesis system. Where these parameters are to be transmitted, the short term filter coefficients are often encoded as Log Area Ratios (LARs) or Line Spectrum Frequencies (LSFs) to make them less sensitive to bit errors caused by noise or interference in the channel.

In a corresponding decoder, or re-synthesis system, the optimum codebook sequence $c^k(n)$ is selected from a codebook and fed to a gain stage which is also fed with a gain parameter. The output of this gain stage is fed to a long term inverse filter which is also fed with the appropriate coefficients. The output of the long term inverse filter is fed to a short term inverse filter which is also fed with appropriate coefficients. The output of this short term filter is fed to an optional post filter which may be included to reduce the effects of quantisation noise. The output of the post filter is fed to a loudspeaker or to a loudspeaker and amplifier in combination to reproduce the synthetic speech.

One disadvantage of the CELP coding system described above is that the exhaustive search of all the sequences in the codebook and the double filtering of every sequence prior to the error comparison is very computationally intense. A typical codebook contains 1024 sequences each of length 40 samples and so the basic CELP scheme described above is not economically feasible to implement in real time.

One proposal to reduce the computational load of a CELP coding system is disclosed in United Kingdom Patent Specification 2 235 354A (PHB 33579) "Speech Coding System and a Method of Encoding Speech".

A one dimensional master codebook containing one long stochastic sequence is used from which sequences are fed to a short term filter to produce a two dimensional filtered codebook. The sequences from the master codebook overlap by a fixed amount and consequently some of the filtering required for each sequence overlaps with that required for the previous and following sequence or sequences. This can reduce the complexity of the codebook sequence filtering considerably. With the maxim overlap between successive sequences in the master codebook of all but one sample, a master codebook of length $(K+N-1)$ will be required, where K is the number of sequences and N is the length of those sequences. An overlap between successive sequences of all but two samples gives better results and will require a codebook of length $(2K+N-2)$.

Despite the fact that using a one dimensional codebook allows a reduction in the complexity of the filtering required by a CELP analogue signal coding system, the number of comparisons to be made between the filtered incoming speech and the filtered codebook sequences is still considerable.

It is an aim of the present invention to reduce the computation required for each incoming block of analogue signals in an analysis by synthesis analogue signal coding system.

DISCLOSURE OF THE INVENTION

According to a first aspect of the present invention there is provided an analogue signal coding system comprising sampling and digitising means for obtaining digitised signal samples, framing means for forming frames comprising a sequence of digitised signal samples, a master codebook containing a plurality of sequences of excitation signal samples, filtering means for deriving filtered sequences of excitation signal samples from the master codebook, characterised in that the analog signal coding system comprises decomposing means for decomposing either the sequence of digitised signal samples or the filtered excitation signal samples into a number of mutual orthogonal component sequences, comparing means for determining for each of the plurality of sequences of excitation samples difference signals between each component sequence and the sequence of digitised signal samples if the orthogonal component sequences are derived from the filtered sequences of excitation samples or between each component sequence and the filtered sequences if the orthogonal component sequences are derived from the digitised signal samples, and means for determining from the difference signals which sequence of the plurality of sequences of excitation samples is the most acceptable sequence of excitation samples in complying with a predetermined error criterion.

The concept of orthogonal sequences as such is known from elementary mathematics. Two sequences, which can be considered as vectors, are called orthogonal if the sum of products of corresponding sample values of the two sequences is equal to 0.

By decomposing either the incoming signal or the filtered codebook signal into mutually orthogonal component sequences prior to comparing them, a substantial saving in comparison effort may be achieved. This is due to the fact that the comparisons with help of orthogonal component sequences can be made independently for these orthogonal component sequences. Hence if the filtered codebook sequences are decomposed into orthogonal component sequences, the analogue signal may be compared with a first set of sequences and then with a second set of sequences orthogonal to the first set of sequences. The total effective number of sequences which are compared is the product of the number of sequences in each orthogonal set. This permits a substantial shortening of the codebook search.

Various techniques are available for performing the decomposition into orthogonal component sequences required by the method of, and system for, coding analogue signals. A division into even and odd frequency components is possible, as is a time domain split so that if a particular sample in a first sequence is non-zero its counterpart in an orthogonal sequence would be zero and vice versa. Another possibility is a frequency domain split so that for example a first set of sequences may contain lower frequency components and a second set of sequences may contain higher frequency components.

The concept of decomposition into orthogonal component sequences may be extended beyond one pair of orthogonal components and further orthogonal splits may be possible. For example a first decomposition into orthogonal component sequences to give two sets of sequences may be effected using even and odd symmetry over a frame and a second decomposition to give four sets of sequences may be effected using even and odd symmetry over half of the frame. Subsequent decompositions could also be effected in the time or frequency domain.

Another possibility is to decompose into orthogonal components the incoming analogue signal prior to comparing it with a set of filtered sequences. If the incoming signals are decomposed into two orthogonal components then two comparisons are necessary, if they are decomposed into four components then four comparisons are necessary and so on.

A single comparing means may be provided to perform each comparison or a smaller number of comparing means may be multiplexed to perform them. It is not always necessary to compare whole length of a codebook sequence with the orthogonalised incoming signal. A shorter length of sequence may be compared and complete sequence may then be formed upon re-synthesis of the signal.

The filtered sequences from the master codebook may be stored before comparison. If they are orthogonalised prior to being stored then two or more sets of filtered sequences are stored. These may then be compared with the sampled incoming signal using one or more comparing means as described above.

A third possibility is for both the incoming signal and the filtered codebook sequence to be decomposed into mutually orthogonal component sequences prior to comparison and this will generally permit a reduced number of comparisons to be made between the filtered codebook sequences and the incoming sequences due to the redundancy in the orthogonalised signals.

According to a second aspect of the invention there is provided an analogue signal coding method comprising sampling and digitising an analogue signal for obtaining digitised signal samples, forming frames comprising a sequence of digitised signal samples, deriving filtered sequences of excitation signal samples from a master codebook comprising a plurality of sequences of excitation samples, characterised in that the analogue signal coding method comprises decomposing either the sequence of digitised signal samples or the filtered excitation signal samples into a number of mutual orthogonal component sequences, determining for each of the plurality of sequences of excitation samples difference signals signals between each component sequence and the sequence of digitised signal samples if the orthogonal component sequences are derived from the filtered sequences of excitation samples or between each component sequence and the filtered sequences if the orthogonal component sequences are derived from the analogue signal samples, and determining from the difference signals which sequence of the plurality of sequences of excitation samples is the most acceptable sequence of excitation samples in complying with a predetermined error criterion.

The codebook sequences should be orthogonal after any necessary filtering processes have been carried out. The filtering means may be coupled to a filter coefficient determining means which causes the filtering means to filter the master codebook sequences in accordance with the characteristics of the incoming signal. The filter coefficient determining means may include a linear predictor.

The means for determining the filter coefficients may also include a long term predicting means for determining the long term redundancy in the analogue signal which may comprise an adaptive loop including a delay.

The master codebook may be a one dimensional codebook as disclosed in the United Kingdom Patent Specification 2 235 354A mentioned earlier. This will generally effect a reduction in the computational complexity of the filtering.

The comparison means may incorporate mean square error means to analyze the differences between the incoming signals and the filtered codebook sequences. The filtered codebook sequences may be fed separately to gain stages prior to being fed to the comparing means and these gain stages may, for example, have independently variable gains or alternatively, gains that are equal magnitude but variable in polarity.

Incoming signals may be fed to filtering means prior to being fed to the comparing means to weight these signals in a manner that emphasises those aspects of these signals which are perceptually of greater importance upon re-synthesis.

The selection of the most appropriate two or more sequences from the filtered codebook sequences can be made independently, so that each selection has no effect on any of the others, or interdependently which can reduce the data rate of the coded signals.

According to a third aspect of the present invention there is a decoding system for obtaining an analogue signal comprising a master codebook containing a plurality of sequences of excitation samples, filtering means for deriving filtered sequences of excitation samples from the master codebook, characterised in that the decoding system comprises decomposing means for decomposing the filtered sequences of excitation samples into sets of mutually orthogonal component sequences and means for obtaining a combined sequence by forming a weighted sum of the mutually orthogonal component sequences in response to an incoming coded signal, and means for transforming the combined sequence into an analogue signal to provide a synthesised replica of a previously coded analogue signal.

According to a fourth aspect of the invention there is provided a decoding method for obtaining an analogue signal, comprising deriving from a master codebook containing a plurality of sequences of excitation samples filtered sequences of excitation samples, characterised in that the decoding method comprises decomposing means for decomposing the filtered sequences of excitation samples into sets of mutually orthogonal component sequences and means for obtaining a combined sequence by forming a weighted sum of the mutually orthogonal component sequences in response to an incoming coded signal, and means for transforming the combined sequence into an analogue signal to provide a synthesised replica of a previously coded analogue signal.

The analogue signal coding system and method of encoding analogue signals according to the first and second aspects of the present invention are based upon an analysis by synthesis technique which involves synthesising a number of possible matches to an incoming signal and selecting one which is close. As a result, the analogue signal re-synthesising system and method of re-synthesising analogue signals in accordance with the third and fourth aspects of the present invention have much in common with their coding system and encoding method counterparts. For example a typical system to perform the re-synthesis of analogue signals will comprise synthetic signal branches similar to those of the coding system used to encode the original analogue signals followed by a post filter to reduce the perceived effects of quantisation noise.

BRIEF DESCRIPTION OF THE DRAWINGS

The present invention will now be explained and described, by way of example with reference to the accompanying drawings, wherein.

In the figures corresponding features have been identified using the same reference numerals.

MODES FOR CARRYING OUT THE INVENTION

Figure 1:
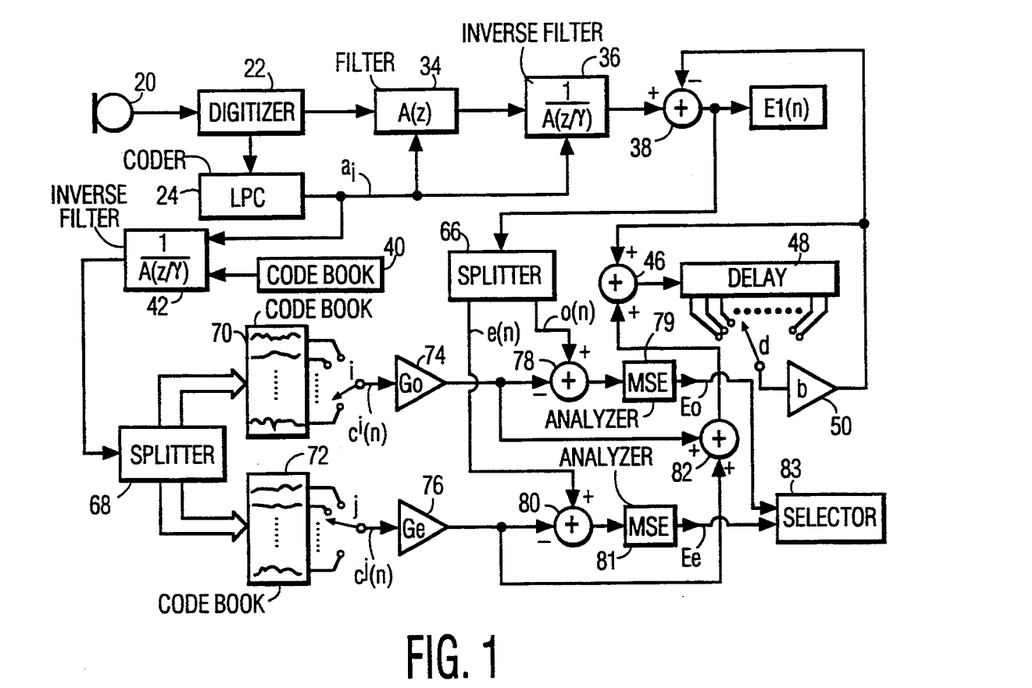
FIG. 1 is a block schematic diagram of an analogue signal coding system employing a one dimensional codebook, an orthogonalising means, two orthogonal filtered codebooks and error measurement means.

FIG. 1 shows a practical analogue signal coding system embodying both a one dimensional master codebook and a pair of orthogonal filtered codebooks. A source of an original analogue signal, shown here as a microphone 20, has an output which is coupled to a framing and quantisation means 22 which digitises the analogue signal and segments it into 5 ms frames and 20 ms blocks. Each block of the digitised analogue signal is fed to and analysed by a Linear Predictive Coder (LPC) 24 which derives a set of short term filter coefficients $a_i$. These filter coefficients are stored or transmitted, depending on the application of the coding system, because they will be required to regenerate a replica of the original analogue signal using a corresponding re-synthesiser. The sampled analogue signal is also fed from the framing means 22 to a short term filter 34 having a transfer function of $A(z)$ and the output of this filter is fed to a short term inverse filter 36 having a transfer function of $1/A(z/\gamma)$. The output of a one dimensional codebook 40 is fed to one input of an inverse filter 42 having a transfer function of $1/A(z/\gamma)$. A second input of the filter 42 is supplied with the short term filter coefficients $a_i$ determined by the linear predictive analysis. $\gamma$ is a perceptual weighting coefficient, chosen to be around 0.65, which appears in this transfer function as a consequence of moving the perceptual weighting filter from the output of the coding system as described by J-P Adoul et.al. in the previously cited reference. The output of the filter 42 is fed to an orthogonalising means 68 which splits each filtered codebook sequence into odd and even sequences. This is achieved by taking a codebook sequence of N samples and reversing the sequence in time. The odd sequence is equal to half of the codebook sequence minus half of the reversed sequence and the even sequence is equal to half of the codebook sequence plus half of the reversed sequence. If a sequence $x(n)$ comprises N components and $x_e(n)$ and $x_o(n)$ are the even and odd sequences respectively resulting from the orthogonalisation:

$$x(n) = x_e(n) + x_o(n)$$

the even sequence is given by $$x_e(n) = \frac{[x(n) + x(N - n + 1)]}{2},$$

and the odd sequence is given by $$x_o(n) = \frac{[x(n) - x(N - n + 1)]}{2}$$

The odd filtered sequences are stored in a 2-dimensional codebook 70 and the even filtered sequences are stored in another 2-dimensional codebook 72. In this example, codebooks 70 and 72 each contain 32 sequences although this number may be varied to suit the application. The selected output sequence $c^i(n)$ from the odd codebook 70 is fed to a gain stage 74 having a gain $G_o$ and whose output is fed to an inverting input of a summer 78. The selected output sequence $c^j(n)$ from the even codebook 72 is fed to a gain stage 76 having a gain $G_e$ and whose output is fed to an inverting input of a summer 80.

Filtered input speech is fed from the output of the filter 36 to a non-inverting input of a summer 38, the output of which summer is an error signal $El(n)$. The error signal $El(n)$ is also fed to an orthogonalising means 66 that separates it into even $e(n)$ and odd $o(n)$ component sequences as described above. The odd output $o(n)$ of the means 66 is fed to a non-inverting input of the summer 78. The even output $e(n)$ of the means 66 is fed to a non-inverting input of the summer 80. The output of the summer 78 is then fed to an MSE analysis means 79 which has an output comprising an odd codebook error signal Eo. The output of the summer 80 is fed to an MSE analysis means 81 which has an output comprising an even codebook error signal Ee. The outputs Eo,Ee of the means 79,81 are fed to a selection means 83.

The outputs of the gain stages 74 and 76 are summed in a summer 82, the output of which summer is fed to a non-inverting input of a summer 46. The output of the summer 46 is fed to a tapped delay line 48 whose delay is defined by a parameter (or pitch predictor index) d. The output of the tapped delay line is fed to a gain stage 50 having a gain (or pitch predictor gain) b. The output of the gain stage 50 is fed to a non-inverting input of the summer 46 and to an inverting input of the summer 38. Although depicted separately, the summers 46 and 82 could be replaced by a single summer with at least three non-inverting inputs.

In operation the coding system uses LPC 24 to determine the short term filter coefficients $a_i$ and the one dimensional codebook sequences are filtered by the weighted short term inverse filter 42. Two separate filtered codebooks are then produced by decomposition using the orthogonalising means 68 and are shown here as two dimensional codebooks 70,72. The error signal sequences $El(n)$ are orthogonalised by the means 66 and then compared with the odd and even synthetic sequences. Equation (1) in FIG. 9 expresses the overall error comparison where $E = Eo + Ee$ and N is the length of the codebook sequences. $El(n)$ is divided into $o(n)$ and $e(n)$ by the orthogonalisation means 66 and the odd and even sequence comparisons are made independently. The odd comparison is performed in the summer 78 and the result is subjected to mean square error analysis in a means 79. These two operations are expressed in equation (2) of FIG. 9. Note that the range of the summation performed by the MSE means has been halved. This saving in processing is due to the symmetry of the sequences being compared. The first (or second) half of an odd or even sequence can be determined from the second (or first) half of that sequence. Since both the codebook sequence and the analogue signal sequence have been orthogonalised into odd and even sequences only half of each sequence need be compared with each other.

Figure 9:
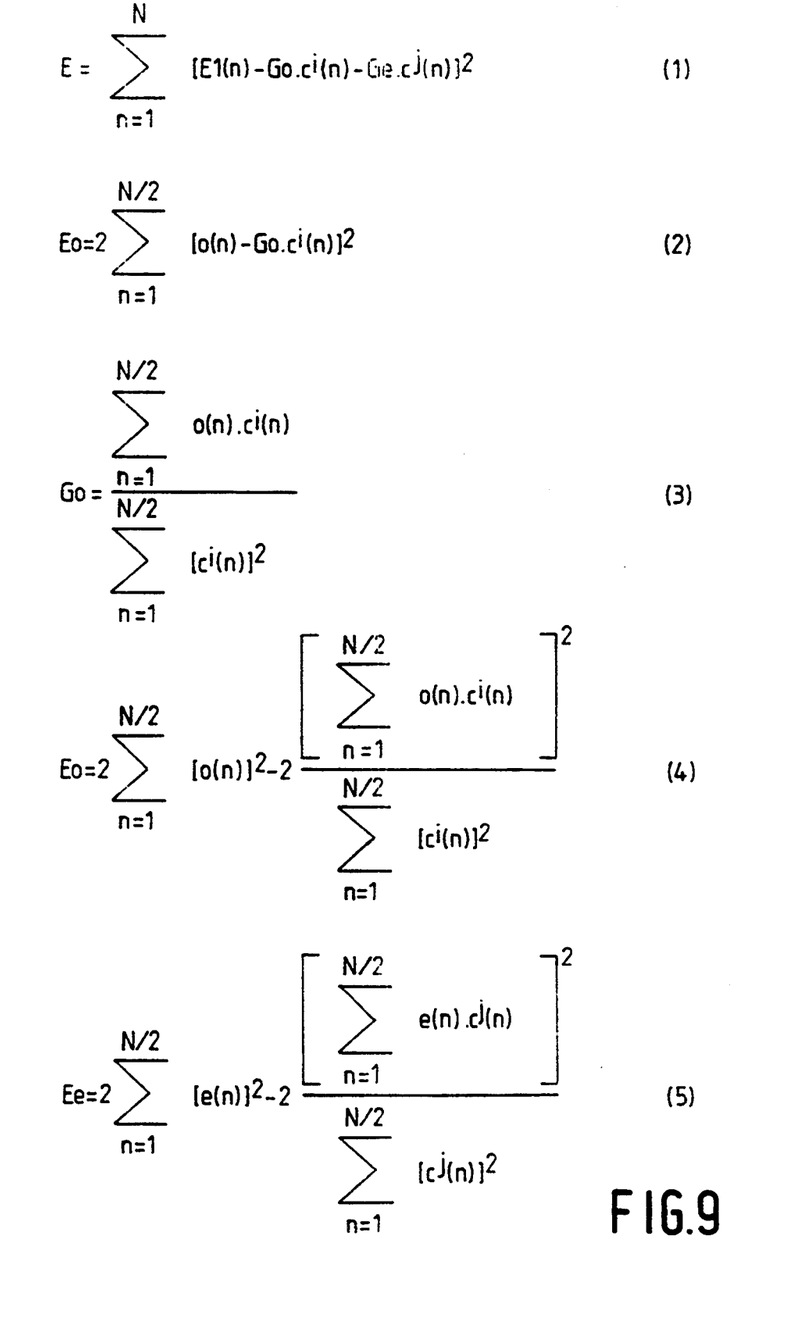
FIG. 9 shows five equations, numbered (1) to (5), relating to the operation of the coding system shown in FIG. 1 with independent codebook gains.

In order to find the optimum odd sequence gain Go, the expression in equation (2) is partially differentiated to give $\delta Eo/\delta Go$ and the result of setting $(\delta Eo/\delta Go) = 0$ is shown in equation (3) of FIG. 9. By substituting equation (3) into equation (2) the minimum value of Eo is defined in terms of the odd filtered sequence $o(n)$ and the codebook sequence and is shown in equation (4) of FIG. 9. The even comparison is performed in the summer 80 and the result is subjected to mean square error analysis in the means 81. By a similar series of steps to those applied to the odd comparison, the minimum value of Ee can be derived and is shown in equation (5) of FIG. 9. The two codebooks 70,72 are searched independently and the codebook output sequences $c^i(n)$, $c^j(n)$ and gains Go,Ge are selected by the means 83 so that Eo and Ee each have their respective minimum values.

Minimising the values of Eo and Ee in equations (4) and (5) respectively entails maximising the value of the quotient term after the minus signs in these equations. This maximisation may be performed by calculating and storing the value of the quotient for the first codebook entry and replacing that stored value with any larger values which are calculated from subsequent codebook sequences. This results in a number of comparisons to determine if an inequality of the following type is true.

$$\frac{w^2}{x} > \frac{y^2}{z}$$

where $y^2/z$ represents the largest quotient term of the equation which has been found so far in the search and $w^2/x$ represents the quotient term corresponding to the codebook entry currently under consideration. Since it is generally preferable to perform multiplications rather than divisions this comparison may be rearranged to be:

$$w^2 \cdot z > x \cdot y^2$$

However, since the terms w and y require to be squared, two multiplications have to be performed for each side of the inequality for every comparison. To simplify this comparison there are two possible ways to eliminate the denominator of the quotient term from the comparison. The first is to assume that the denominator of the quotient terms is constant, regardless of the sequence number under consideration. The comparison may then be simplified to $w^2 > y^2$, and since w and y are never negative to $w > y$. While this assumption will not be valid in all cases, subjective tests with human speech have shown no noticeable deterioration in the quality of the subsequently reproduced speech.

The second way to eliminate the denominator terms from the comparison is to scale the values of the sequences in the sub-codebooks so that the sum of the squares of the values over the length of each sequence (which is what the denominator of the quotient term represents) are equal. For example the sum of the squares of the samples from a sequence from each of a first sub-codebook and a second sub-codebook are calculated and a scaling factor for the samples in the second sub-codebook is equal to the square root of the quotient comprised of the first sum of squares divided by the second sum of squares.

Returning to FIG. 1, the outputs of the two gain stages 74,76 are also summed and the resulting signal is used to provide the input to the pitch predictor, which comprises the summer 46, the tapped delay line 48, the gain stage 50, the summer 38 and a means (not shown) of selecting a tapped delay line parameter d and a pitch gain b so that the error signal $El(n)$ is a minimum. In this coding system, a pair of orthogonal codebooks provide a total combination of K stochastic sequences when each codebook contains only $\sqrt{k}$ sequences. Thus the use of two orthogonal codebooks provides a reduction in the computational complexity of the codebook search by a factor of $\sqrt{K}/2$. For example, if the equivalent non-orthogonal codebook was 1024 sequences long, each of the orthogonal filtered codebooks would be 32 sequences long and so a search of just 64 sequences would be required.

The effective number of codebook sequences with which the filtered analogue signal is compared may be doubled by also comparing the inverted codebook sequences with the filtered analogue signal. Thus for the same codebook sequence diversity the size of the codebooks may be halved.

It is possible to omit the orthogonalisation means 66 and apply the error signal $El(n)$ to the summers 78 and 80 directly. Since the comparison with odd and even sequences will automatically reject those components in the signal $El(n)$ which are even and odd respectively, the orthogonalisation of the signal $El(n)$ is not required. If the means 66 is omitted the comparison between the codebook and analogue signal sequences should be made over the whole length of the sequences, the half length sequence comparison described will not be adequate.

It is possible to omit the sub-codebooks 70,72 and compare the filtered codebook sequences with the filtered incoming signal as soon as the codebook sequences have been orthogonalised.

Figure 2:
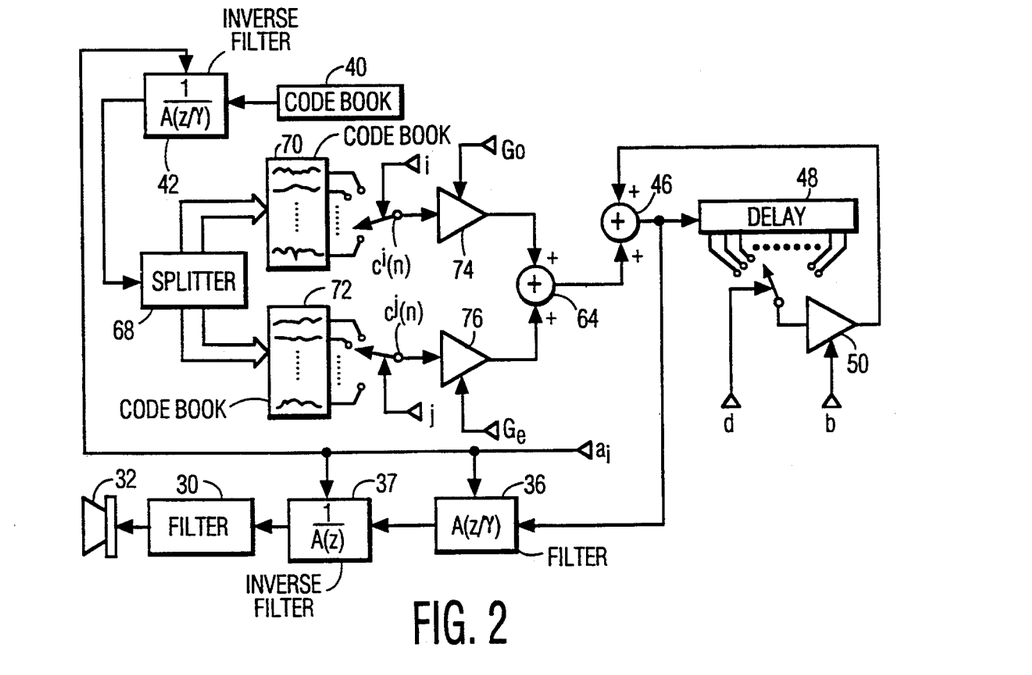
FIG. 2 is a block schematic diagram of an analogue signal decoding system suitable for use with the coding system shown in FIG. 1.

FIG. 2 shows a system for re-synthesising speech signals that have been encoded using the system shown in FIG. 1 and elements of the system that are the same as those shown in that Figure are denoted by the same reference numerals. The output of a one dimensional codebook 40 and the coefficients $a_i$ are fed to a weighted short term inverse filter 42 having a transfer function of $1/A(z/\gamma)$. The output of the filter 42 is fed to an orthogonalising means 68 which separates the filtered codebook sequences into an odd and an even sequence over the length of a codebook sequence. Odd sequences are stored in a filtered codebook 70 and even sequences are stored in a filtered codebook 72. The output sequence $c^i(n)$ is selected from the codebook 70 and is fed to a gain stage 74 having a gain of Go. The output sequence $c^j(n)$ is selected from the codebook 72 and is fed to a gain stage 76 having a gain of Ge. The outputs of the gain stages 74 and 76 are both fed to non-inverting inputs of a summer 64 whose output is fed to a non-inverting input of a summer 46. The output of the summer 46 is fed to a tapped delay line 48 having a delay defined by a parameter d. The output of the delay line is fed to a gain stage 50 having a gain of b. The output of the gain stage is fed to a non-inverting input of the summer 46. In addition to being fed to the tapped delay line 48, the output of the summer 46 is fed together with the coefficients $a_i$ to a weighted short term filter 36 having a transfer function of $A(z/\gamma)$. The output of the filter 36 together with the coefficients $a_i$ are fed to a short term inverse filter 37 having a transfer function of $1/A(z)$. The output of the filter 37 is fed to an optional post filter 30 and then to a loudspeaker 32 or to an amplifier and loudspeaker in combination.

The re-synthesis system is fed with the codebook sequence numbers i,j, the gains Go,Ge, the short term filter coefficients $a_i$ and the pitch predictor parameters d,b from a coding system such as the one shown in FIG. 1. The amplified codebook sequences from each of the gain stages are summed and then fed successively to long term and short term filters. The long term filter comprising the summer 46, the tapped delay line 48 and the gain stage 50 adds the long term or pitch redundancy and the two short term filters 36,37 add the short term redundancy that was removed from the analogue signals by the coding system. The post filter 30 can be included in order to reduce the perceived effects of quantisation noise.

The analogue signal coding system shown in FIG. 1 includes two orthogonalisation means 66,68 for orthogonalising the filtered incoming signal and the filtered codebook sequences, respectively. When the filtered incoming analogue signals are orthogonalised into odd and even functions by a means 66 only half length incoming and codebook sequences need to be compared. A full length sequence can be constructed from an arbitrary half length codebook sequence and, furthermore, both an odd and an even full length sequence can be constructed from any half length sequence. Consequently it is not necessary for the half length codebook sequences to have been derived from full length codebook sequences by orthogonalisation. The same set of half length sequences can thus be compared with both the odd and even half length filtered incoming signal sequences. Taking a half length sequence represented by $$c(n) \text{ for } n=1 \text{ to } N/2$$

the odd and even full sequences are given by $$c^i(n)=c(n) \text{ for } n=1 \text{ to } N/2$$

$$c^i(n)=-c(N-n+1) \text{ for } n=[(N/2)+1] \text{ to } N$$

and $$c^j(n)=c(n) \text{ for } n=1 \text{ to } N/2$$

$$c^j(n)=c(N-n+1) \text{ for } n=[(N/2)+1] \text{ to } N$$

respectively and these full length sequences are constructed upon re-synthesis of the analogue signal.

Alternatively a different set of half length codebook sequences may be used for the odd and even comparisons which may be considered as altering $c^j(n)$ in the above equations, thus:

$$c^j(n)=c'(n) \text{ for } n=1 \text{ to } N/2$$

$$c^j(n)=c'(N-(n-1)) \text{ for } n=[(N/2)+1] \text{ to } N$$

where c' represents a different codebook from c or a different section in the same codebook.

Whether the same set or a different set of half length sequences are used, the codebook sequences no longer need to be orthogonalised and so the orthogonalisation means 68 can be eliminated. If both of the sub-codebooks are to contain the same set of half length sequences there is no need to duplicate the sub-codebooks and there are simplifications possible in the calculations of the error terms in the equations (4) and (5). Since the two denominator terms in these equations will be equal a reduction in the computation is possible.

Figure 3:
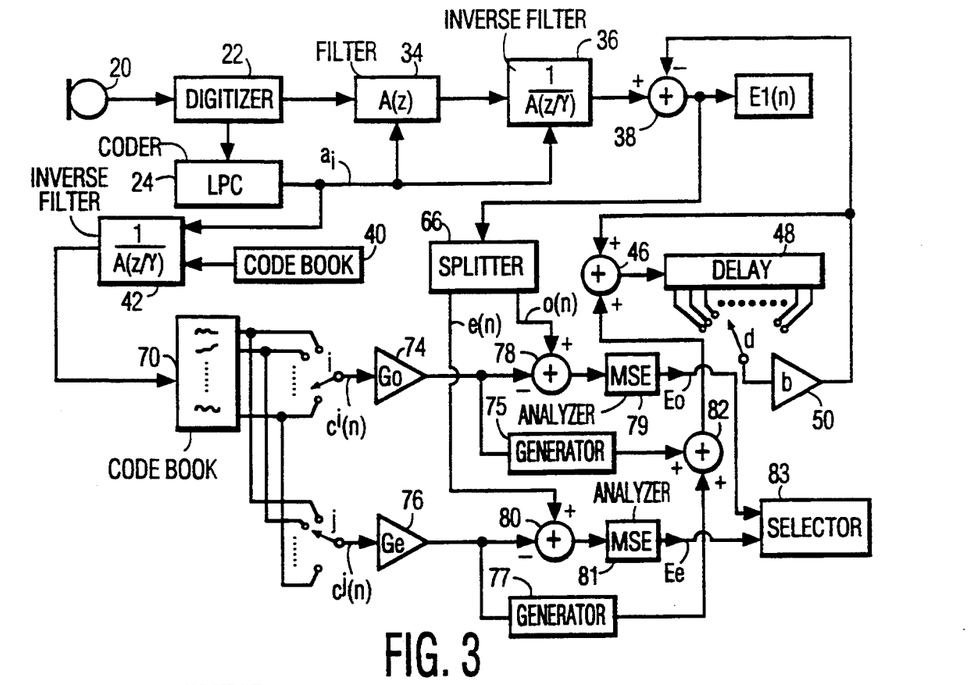
FIG. 3 is a block schematic diagram of an analogue signal coding system in which only the incoming speech is orthogonally decomposed.

An analogue signal coding system which uses a single sub-codebook containing half-length sequences is shown in FIG. 3. The arrangement is identical with that shown in FIG. 1 with the following exceptions. The output of the filter 42 is fed to a single sub-codebook, shown as a two-dimensional codebook 71. The sequences stored in the codebook 71 are half length sequences and have been filtered in accordance with the incoming analogue signal as previously described. The $i^{th}$ sequence in the sub-codebook 71 is fed to a gain stage 74 having a gain Go. The output of the gain stage 74 is fed to an inverting input to a summer 78 and to a full length sequence generator 75. The generator 75 derives a full length odd sequence from the half length sequence at the output of the gain stage 74. The output of the generator 75 is fed to a non-inverting input to a summer 82. The $j^{th}$ sequence in the sub-codebook 71 is fed to a gain stage 76 having a gain of Ge. The output of the gain stage 76 is fed to an inverting input to a summer 80 and to a full length sequence generator 77. The generator 77 derives a full length even sequence from the half length sequence of the output of the gain stage 76. The output of the generator 77 is fed to a non-inverting input to the summer 82. The generators 75,77 are required to ensure the correct operation of the long term predictor and their operation is described subsequently with reference to FIG. 4. The remainder of the system is identical to that of FIG. 1.

In operation one half of the odd sequence and one half of the even sequence derived by the orthogonalisation means 66 for each frame of incoming analogue signals is compared with the scaled half length sequences stored in the sub-codebook 71 in the means 78,80. While the sub-codebook 71 is searched for appropriate matching half length sequences, i and j may be equal to one another and each increase from 1 to the length of the codebook.

Alternatively the means 76,80 and 81 could be eliminated and the optimum half length sequence could be determined for both the odd and even filtered incoming sequences by using one gain stage, comparator and Mean Square Error means multiplexed between the orthogonalised incoming sequences. The orthogonal outputs of the means 66 would be supplied alternately to the single comparator 78 so that both odd and even outputs of the means 66 are compared with each half length sequence from the sub codebook. As for the embodiment shown in FIG. 1, two separate codebook indices i,j are derived.

Filtered sequences of any length may be obtained from the master codebook. If, for example, a full length sequence is obtained, two half length sequences which are different to one another may be selected and used for comparison with the incoming signal, although no advantage in so doing has been detected for speech. Where one half length sequence is used for both comparisons it can be derived by filtering only a half length sequence from the master codebook. The half length sequence need not be derived or selected from a filtered full length sequence.

Figure 10:
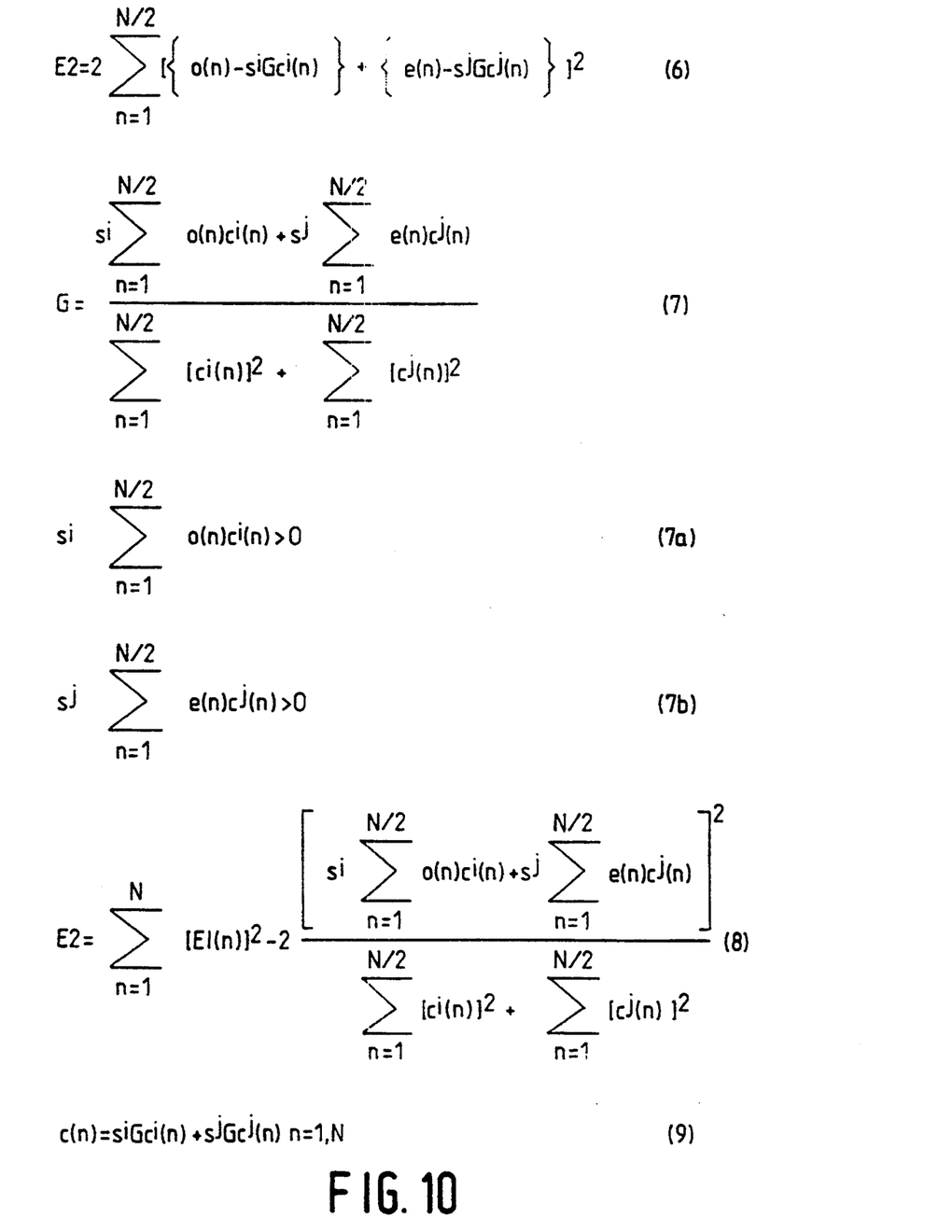
FIG. 10 shows a further six equations, numbered (6), (7), (7a), (7b), (8) and (9) relating to the operation of the coding system shown in FIG. 1 with the codebook gains equal.

In addition to not requiring the orthogonalisation of the codebook sequences, using equal half length sequences for both the odd and even sequence comparisons permits a further simplification in the determination of Eo and Ee as shown in equations (4) and (5) in FIG. 9. Since $$\sum_{n=1}^{N/2} [c^i(n)]^2 = \sum_{n=1}^{N/2} [c^j(n)]^2 \text{ when } i = j,$$

the number of calculations to determine the values of the denominators in equations (4) and (5) is halved. This can also be considered as a halving of the number of calculations required to determine the denominator of the term in equation (8) in FIG. 10 which will be discussed later.

Figure 4:
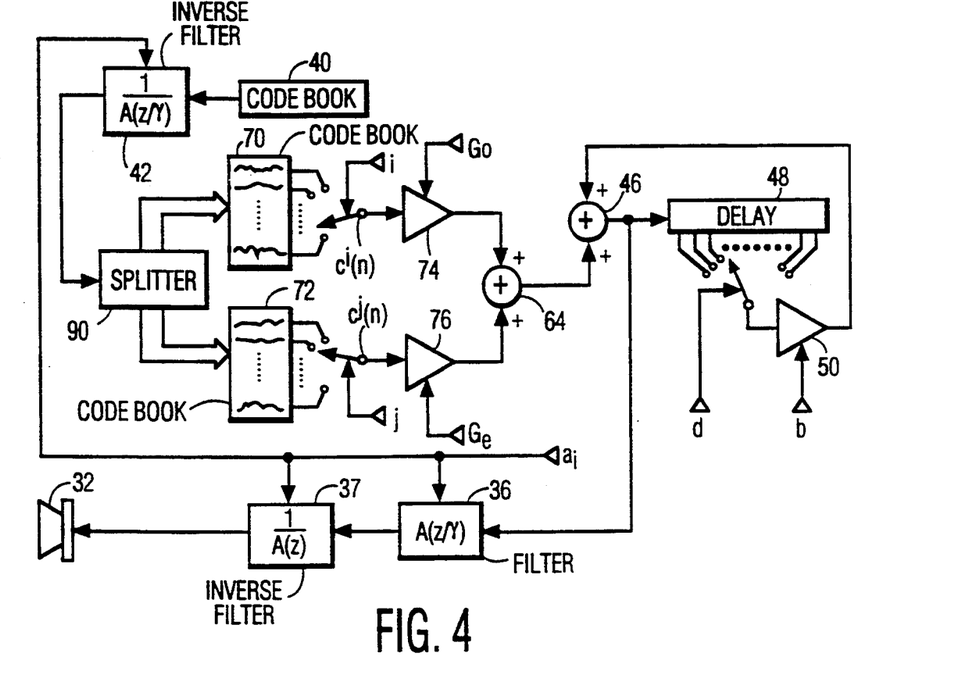
FIG. 4 is in block schematic diagram of an analogue signal decoding system suitable for use with the coding system shown in FIG. 3.

A re-synthesis system corresponding to the coding system of FIG. 3 is shown in FIG. 4. This system is identical to that shown in FIG. 2 with the exception that the orthogonalisation means 68 has been replaced by an orthogonal sequence generator 90. The gain values Go,Ge, short term filter parameters $a_i$, long term filter parameters d,b and codebook indices i,j are supplied to the system as in the previously described embodiment. The contents of the master codebook 40 are fed to a short term filter 42 and the output of this filter is fed to the orthogonal sequence generator 90. This generator operates to convert filtered codebook half length sequences c(n) for n=1 to N/2 to odd and even full length sequences:

$$c^i(n) = c(n) \text{ for } n=1 \text{ to } N/2$$

$$c^i(n) = -c(N-n+1) \text{ for } n=[(N/2)+1] \text{ to } N$$

and $$c^j(n) = c(n) \text{ for } n=1 \text{ to } N/2$$

$$c^j(n) = c(N-n+1) \text{ for } n=[(N/2)+1] \text{ to } N$$

which sequences are stored in the sub-codebooks 70,72 respectively. The generators 75,77 (FIG. 3) operate in the same manner as the generator 90. The relevant full length sequences for each frame of the incoming speech are selected and fed to the gain stages 74,76, the outputs of these gain stages are summed and filtered through long and short term filters as before to provide the output of the system, for example to a loudspeaker 32.

The construction of both the odd and even full length sequences for every filtered sequence from the master codebook is not strictly necessary and a single codebook containing half length sequences may be used as in the coding system shown in FIG. 3. The full length sequences to be fed to the gain stages 74,76 can be constructed in accordance with the equations above after the relevant half length sequences are selected from the slave codebook.

The analogue signal coding systems shown in FIGS. 1 and 3 require two gain parameters for each frame of the incoming signal and in a situation when the bit rate for transmission or storage is critical this may be unacceptable. The number of bits required to represent the gain parameters may increase significantly with respect to a coding system having only a single codebook and gain stage. Since these two gain parameters represent related signals there will be some degree of correlation between them and so it may be possible to represent one gain relative to the other and obtain a slight saving in the number of bits required.

The systems shown previously may be used without extra bits being required to represent a second codebook gain by requiring that the two gains are equal (i.e. Go=Ge), or even better that their magnitudes are equal and their signs can be positive or negative. The latter case will incur a penalty of only one bit over a single codebook coding system. The gain values are transmitted as a sign for each selected codebook sequence and a single magnitude applying to both codebook sequences.

This can be achieved in at least three ways:

(1) Calculate the total mean square error (Eo+Ee) for each possible pair of codebook sequences, subject to the constraints that $|Go|=|Ge|$ and that the MSE is minimised. This gives the optimum codebook indices (i,j), the magnitude of gain $(G=|Go|=|Ge|)$ and the signs of Go and Ge, $s^i=Go/|Go|=\pm 1$ and $s^j=Ge/|Ge|=\pm 1$. Firstly the combined error E2 is calculated as shown in Equation (6) of FIG. 10. The magnitude G of the gains Ge and Go is calculated using equation (7) of FIG. 10. In equation (7) $s^i$ must be chosen so that it is of the same sign as the sum of the products of o(n) and $c^i(n)$ over a whole frame length (or half a frame length in the case of symmetrical sequences). Similarly $s^j$ must be chosen to have the same sign as the sum of the products of e(n) and $c^j(n)$. These constraints upon the values of $s^i$ and $s^j$ are to prevent the values of Go and Ge being negative and are summarised in inequalities (7a) and (7b), respectively, of FIG. 10.

Combining equations (6) and (7) gives equation (8) and values of i and j are selected that cause the error E2 in equation (8) of FIG. 10 to be a minimum.

The two codebook sequences can be combined to form a composite codebook entry c(n) using equation (9) of FIG. 10, in which equation a value of G is calculated from equation (7). This composite codebook entry is then fed to the summer 82 (FIG. 3).

(2) Search each codebook separately for the sequences giving minimum values of Eo and Ee respectively, without constraint on the values of Go and Ge. Then, using this pair of codebook sequences, calculate the magnitude of G such that $G=|Go|=|Ge|$, together with the signs of Go and Ge, to minimise the total MSE which is equal to (Eo+Ee).

The first step is to find the codebook entry, that is the value of i which results in the minimum value of Eo in equation (2) and the codebook entry, that is the value of j which gives the minimum value of Ee in the orthogonal equivalent of equation (2). The gain Go is given by equation (3) and the gain Ge is given by the orthogonal equivalent of equation (3). Then the signs $s^i$ and $s^j$ of the gains Go and Ge can be determined from inequalities (7a),(7b) and the magnitude G of the two gains can be determined from equation (7) as before. Finally a composite codebook entry c(n) is determined as before using equation (9). This second method gives sub-optimum values for codebook indices (i,j), the magnitude of the gains $(G=|Go|=|Ge|)$ and the signs of Go and Ge ($s^i=Go/|Go|$ and $s^j=Ge/|Ge|$ respectively) but with much less computational complexity than the first alternative. In a practical coding system used for coding human speech there is virtually no perceived difference between the two approaches.

(3) The method (2) can be modified to give better results as follows. The at least two sequences from each codebook which result in the lowest values of error signal are selected using equations (4),(5) giving, for example, two pairs of codebook indices, $(i_1,i_2)$, $(j_1,j_2)$. The total error resulting from each of the four possible combinations of these sequences $(i_1,j_1)$, $(i_2,j_2)$, $(i_1,j_2)$, $(i_2,j_1)$ are then calculated by adding the values of Ee and Eo in each case and the pair of sequences which results in the lowest error are chosen. The method then proceeds as above from the calculation of the gains Go and Ge. This procedure could also include quantisation of the gain value within the search without a great increase in computational complexity. This quantisation entails setting the values of the gains Go and Ge to one of the possible output values which the coding system permits prior to the calculation of the error signals Eo and Ee and should yield better results when, for example, one of the gain values originally calculated is especially distant from one of the available quantised values. More than two sequences could be selected from each codebook and more than two codebooks could be used.

These changes would have no impact on the decoders or re-synthesisers shown in FIGS. 2 and 4 which function as described previously.

Figure 5:
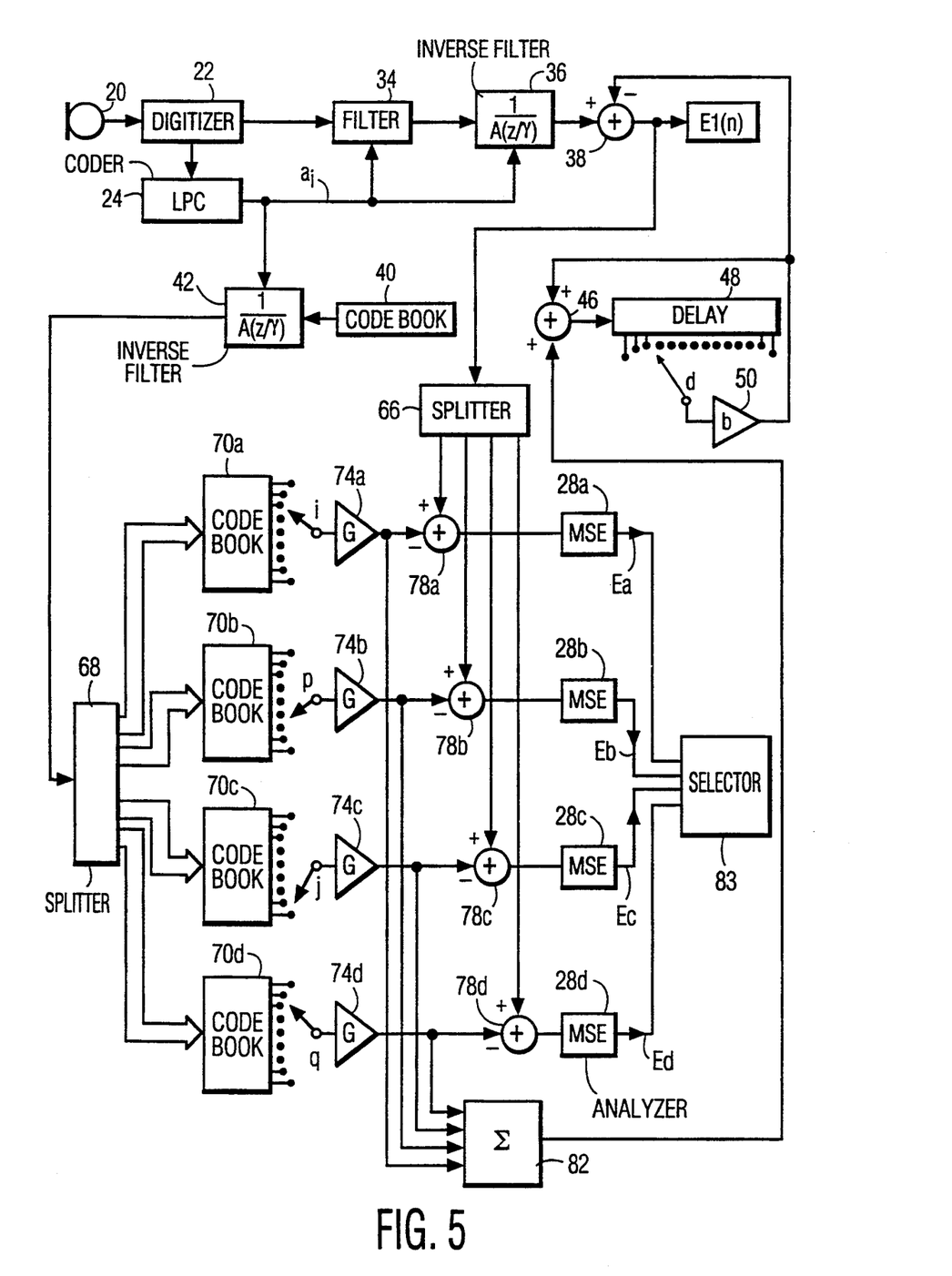
FIG. 5 is a block schematic diagram of an analogue signal coding system employing a one dimensional codebook and four two dimensional orthogonal codebooks.

FIG. 5 shows a coding system derived from that shown in FIG. 1 but which employs four orthogonal codebooks. A source of original speech 20, a framing and quantisation means 22, a Linear Prediction Coefficient (LPC) generator 24, a short term filter 34 and a short term inverse filter 36 are arranged as in the coding system shown in FIG. 1 and function in the same manner. The output of the filter 36 is fed to a non-inverting input of a summer 38, the output of which summer comprises an error signal El(n). The output of a one dimensional codebook 40 is fed to a short term inverse filter 42 having a transfer function of $1/A(z/\gamma)$. This filter is fed with the short term filter coefficients $a_i$ derived by the LPC means 24. The output of the filter 42 is fed to an orthogonalisation means 68 which has four outputs which can be regarded as two pairs of outputs and which are all fed to separate two dimensional codebooks 70a, 70b, 70c, 70d. The sequence number i from the codebook 70a is fed to a gain stage 74a whose output is fed to a non-inverting input of a summer 82 and to the inverting input of a summer 78a. The output of the summer 78a is fed to a MSE means 28a whose output is an error signal Ea. The sequence number p from the codebook 70b is fed to a gain stage 74b whose output is fed to a non-inverting input of the summer 82 and to an inverting input of a summer 78b. The output of the summer 78b is fed to a MSE means 28b whose output is an error signal Eb. The sequence number j from the codebook 70c is fed to a gain stage 74c whose output is fed to a non-inverting input of the summer 82 and to an inverting input of a summer 78c. The output of the summer 78c is fed to a MSE means 28c whose output is an error signal Ec. The sequence number q is fed from the codebook 70d to a gain stage 74d whose output is fed to a non-inverting input of the summer 82 and to an inverting input of a summer 78d. The output of the summer 78d is fed to a MSE means 28d whose output is an error signal Ed. The output signals Ea,Eb,Ec,Ed from the four MSE means 28a, 28b, 28c, 28d are fed to a selection means 83.

The output of the summer 38 is fed to a second orthogonalisation means 66 which has four outputs and operates in an analogous manner to the orthogonalising means 68. The four outputs of the means 66 are each fed to a non-inverting input of the corresponding summers 78a, 78b, 78c or 78d. The output of the summer 82 is fed to a non-inverting input of a summer 46. The output of the summer 46 is fed to a tapped delay line 48 whose output, at a delay d, is fed to a gain stage 50 having a gain b. The output of the gain stage 50 is fed to an inverting input of the summer 38 and to a non-inverting input of the summer 46.

The orthogonalisation means 66,68 may perform the orthogonalisation of a single sequence into four mutually orthogonal sequences in a number of ways. If a first orthogonalisation is performed upon the sequence to provide odd and even sequences, each of these sequences may then be orthogonalised in the time or frequency domains. Time domain orthogonalisation comprises making a first sequence having a number of zero and non-zero members and a second sequence comprising a number of zero and non-zero members. Where a member of the first sequence is non-zero the corresponding member of the second sequence must be zero and vice versa. The rule that orthogonal sequences must multiply to zero is thus obeyed. Frequency domain orthogonalisation comprises making a pair of sequences which contain signals from separate frequency bands, for example a first sequence containing lower frequency components and a second sequence containing higher frequency components.

Figure 6:
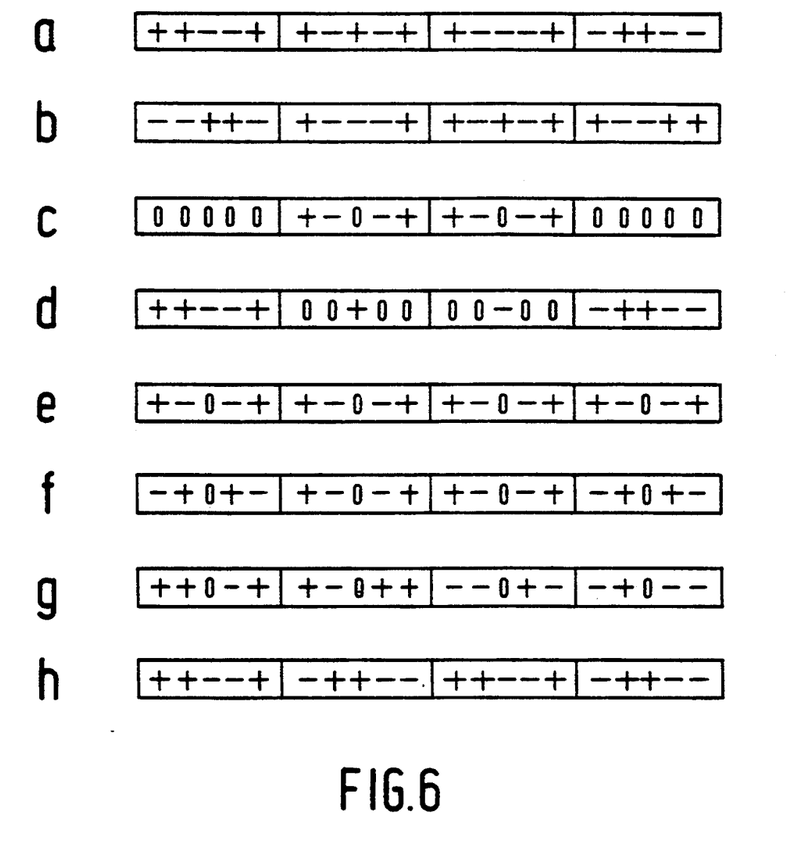
FIG. 6 is a set of sequences to help to describe the operation of the system of FIG. 5.

Alternatively the means 66,68 may perform an odd and even orthogonalisation over a complete sequence length followed by further odd and even orthogonalisations over half of a sequence length. This may be better understood by reference to FIGS. 6(a) to 6(h) where the orthogonalisation of a 20 member sequence is depicted in a sign only format for ease of understanding. Firstly an original sequence (a) is taken and a time reversed version (b) is formed. An even sequence (c) is formed by the addition of (b) to (a), the divisions by two of the summed sequences being omitted for the purposes of this example. An odd sequence (d) is formed by the subtraction of (b) from (a), the division by two again being ignored. The first half of the even sequence (c) is then taken and a time reversed version is formed. The addition of the first half of sequence (c) and its time reversed version provides the first half of the sequence (e). The second half of the sequence (c) is similarly added to its time reversed version to obtain the second half of the sequence (e). The sequence (e) represents an even orthogonalisation followed by an even orthogonalisation. The time reversed version of the first half of sequence (c) is subtracted from the first half of sequence (c) to give the first half of sequence (f). The second half of sequence (f) is derived in the same manner from the second half of the sequence (c). The sequence (f) represents an even orthogonalisation followed by an odd orthogonalisation. The sequences (g) and (h) are derived from the sequence (d) as the sequences (e) and (f) are derived from the sequence (c). Sequence (g) represents an odd orthogonalisation followed by an even orthogonalisation and sequence (h) represents an odd orthogonalisation followed by an odd orthogonalisation. All of the sequences (e), (f), (g) and (h) are mutually orthogonal, that is to say that the product of any one with any other over its whole length is zero. This mutual orthogonality permits the four comparisons shown in the coding system of FIG. 5 to be made independently of each other. In a practical system the magnitudes of the gains of the gain stages 74a,74b,74c,74d are constrained to be equal and are shown here as all being equal to G.

The coding system shown in FIG. 5 may be modified to remove the orthogonalisation of the codebook sequences by only comparing a filtered quarter length sequence from the master codebook with the odd and even orthogonalised filtered analogue signals. The set of filtered codebook quarter length sequences may be different for each of the orthogonal comparisons or it may be the same. Sequences are selected for each of the four orthogonal comparisons and the index numbers i,p,j,q are transmitted or stored. If the quarter length sequences are the same a simplification in the determination of the sequence number chosen from the codebook may be effected as described above.

Figure 7:
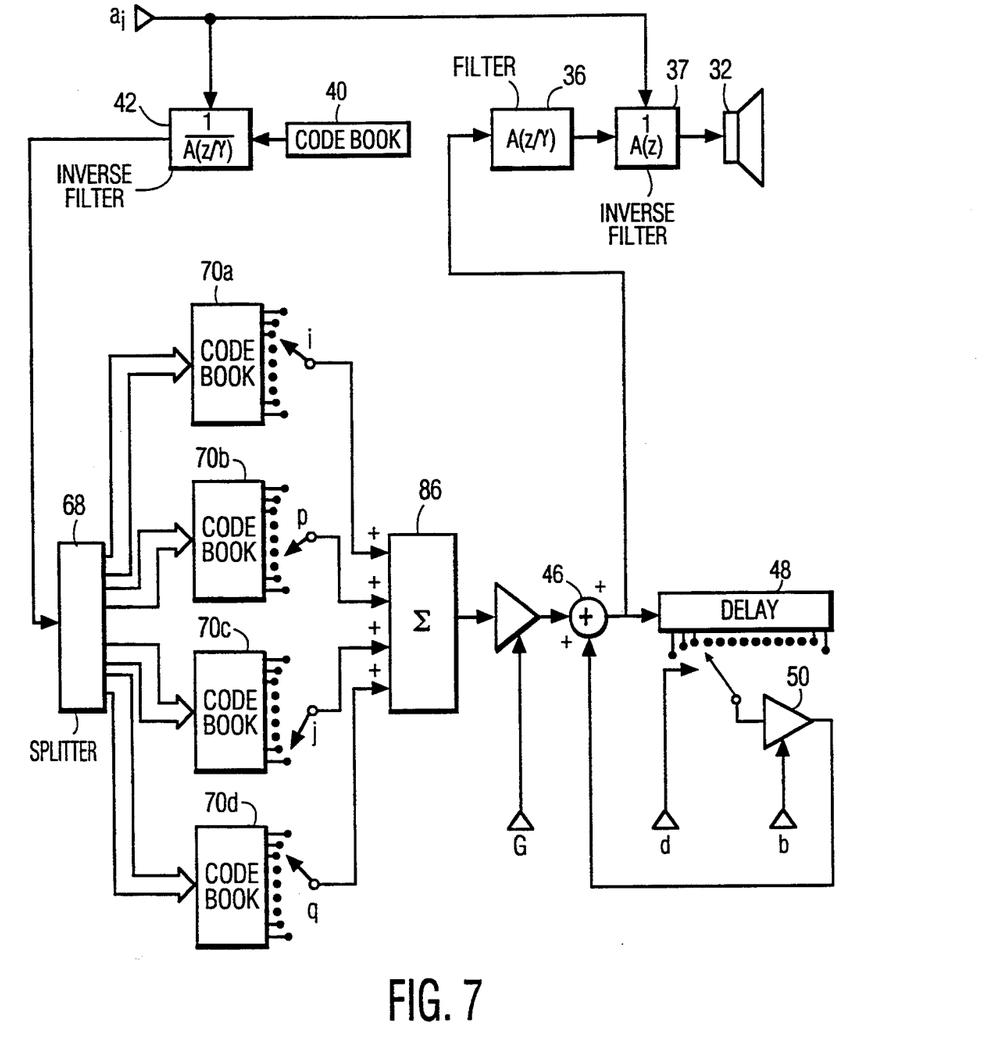
FIG. 7 is a block schematic diagram of an analogue signal decoding system suitable for use with the coding system of FIG. 5.

FIG. 7 shows a corresponding decoder or re-synthesis system for use with the coder of FIG. 5. The output of a one dimensional codebook 40 is fed to a short term inverse filter 42 having a transfer function of $1/A(z/\gamma)$. The output of the filter 42 is fed to an orthogonalising means 68 which has four separate outputs each of which is fed to one of four two dimensional codebooks 70a,70b,70c and 70d. The sequence number i from the codebook 70a, the sequence number p from the codebook 70b, the sequence number j from the codebook 70c and the sequence number q from the codebook 70d are all fed to separate non-inverting inputs of a summer 86. The output of the summer 86 is fed to a gain stage 12 which is also fed with a gain parameter G. The output of the gain stage 12 is fed to a non-inverting input of a summer 46. The output of the summer 46 is fed to a tapped delay line 48 which is also fed with a delay parameter d. The output of the tapped delay line 48 is fed to a gain stage 50 which is also fed with a gain parameter b. The output of the gain stage 50 is fed to a non-inverting input of a summer 46. The output of the summer 46 is also fed to a short term filter 36 having a transfer function of $A(z/\gamma)$. The output of the filter 36 is fed to a short term inverse filter 37 having a transfer function of $1/A(z)$. The output of the filter 37 is fed to a loudspeaker 32 or to an amplifier and loudspeaker in combination. The three short term filters 42, 36 and 37 are all fed with the short term filter parameters $a_i$ originally derived by the LPC means 24 (FIG. 5).

In operation the decoder shown in FIG. 7 is fed with the codebook indices i,p,j,q, the gain parameter G, the pitch predictor parameters d,b and the short term filter parameters $a_i$. The four orthogonal codebook sequences are added together and after amplification and filtering, are fed to an output means, in this case a loudspeaker.

In order to make the system of FIG. 7 compatible with that of FIG. 5 when the latter has been modified to compare only one quarter length filtered codebook sequence with each of the orthogonalised analogue signal, the system of FIG. 7 has an orthogonal sequence generator 90 (FIG. 4) substituted for the orthogonalisation means 68. The orthogonal sequence generator functions as follows to generate four orthogonal full length sequences from a single quarter length sequence.

Figure 8:
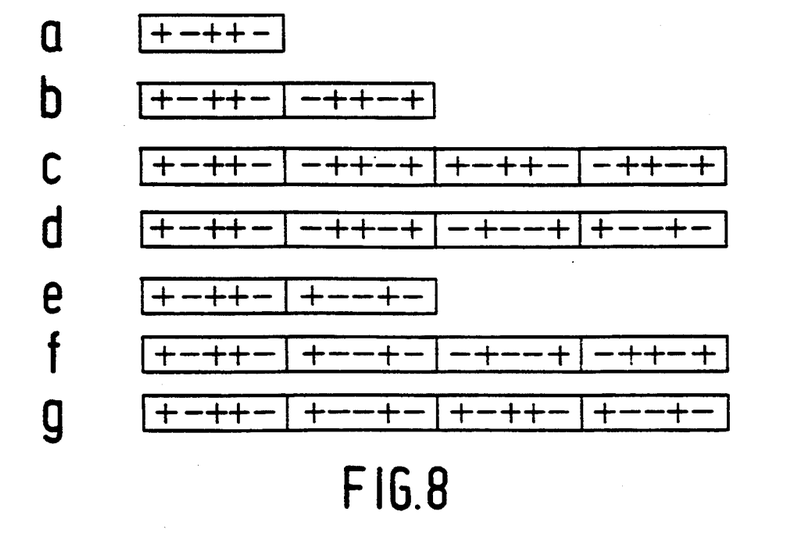
FIG. 8 is a set of sequences to help to describe the operation of the system of FIG. 7.

The orthogonal sequence generator first produces half length odd and even sequences and then uses each of these two sequences to produce odd and even full length sequences. FIG. 8 illustrates this procedure for a quarter length sequence (a) having five members which is shown only in a sign format for simplicity. By producing a time reversed version of the quarter length sequence (a) and adding it to the end of sequence (a), a half length even sequence (b) is produced. By producing a time reversed version of the sequence (b) and adding it to the end of sequence (b), a full length sequence (c) is produced. The sequence (c) is equivalent to a full length sequence which has been orthogonalised to give a full length even sequence and then orthogonalised to give an even sequence over each half of a sequence length. A time reversed, inverted version of the sequence (b) is added to the end of the sequence (b) to provide a full length sequence (d). The sequence (d) is equivalent to a full length sequence which has been orthogonalised to give a full length odd sequence and then orthogonalised to give a even sequence over each half of a sequence length.

A time reversed inverted version of the sequence (a) is added to the end of the sequence (a) to give the half length sequence (e). By adding a time reversed version of the sequence (e) to the end of that sequence a full length sequence (f) is produced. The sequence (f) is equivalent to a full length sequence which has been orthogonalised to give a full length even sequence and then orthogonalised to give an odd sequence over each half of a sequence length. By adding a time reversed inverted version of the sequence (e) to the end of that sequence a full length sequence (g) is produced. The sequence (g) is equivalent to a full length sequence which has been orthogonalised to give a full length odd sequence and then orthogonalised to give an odd sequence over each half of a sequence length.

These four filtered sequences (c),(d),(f),(g) are then fed to the slave codebooks 70a,70b,70c,70d (FIG. 7) and the re-synthesiser then operates as described above.

The orthogonal codebooks required to fully realise the reduction in length of the codebook search can be constructed in a number of different ways provided that the equation $$\Sigma(CB1 \times CB2) = 0$$

is satisfied, where CB1 is any sequence in the first codebook and CB2 is any sequence in the second codebook. Possible alternatives to the odd and even function split described above are a time domain split or a frequency domain split. Using a time domain split, for example, CB1 could contain random samples for the first half of the codebook, that is the first N/2 samples in each sequence and zero samples thereafter and CB2 could contain zero samples for the first half of the codebook, that is the first N/2 samples and random samples thereafter. A frequency domain split could, for example, be achieved by using a low pass and a high pass filter to generate a low frequency codebook and a high frequency codebook.

It is also possible for an analogue signal coding system to have an odd number of orthogonal codebooks. For example a first split of the codebook sequences into high and low frequency components could be followed by a further split into odd and even frequency components in the higher frequency branch.

For any combination of coding and re-synthesising systems to function correctly, the codebooks in the two systems must contain the same sequences.

From reading the present disclosure other modifications will be apparent to persons skilled in the art. Such modifications may involve other features which are already known in the design, manufacture and use of analogue signal coding systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

Industrial Applicability

The present invention is applicable to a range of systems using analogue signal coding and decoding, for example, digital mobile radio and cellular telephones.

We claim:

1. An analog signal coding system comprising:

sampling and digitizing means for obtaining digitized signal samples, a master codebook containing a plurality of sequences of excitation signal samples, and filtering means for deriving filtered sequences of excitation signal samples from the master codebook, characterized in that the analog signal coding system comprises:

decomposing means for decomposing either a sequence of digitized signal samples or one of the filtered sequences of excitation signal samples into a number of mutually orthogonal component sequences, comparing means for comparing mutually orthogonal component sequences with a sequence of digitized signal samples to provide difference signals if the orthogonal component sequences are derived from the filtered sequences of excitation signal samples, and for comparing mutually orthogonal component sequences with the filtered sequences of excitation signal samples to provide difference signals if the orthogonal component sequences are derived from the sequence of digitized signal samples, and means for determining from the difference signals which sequence of the plurality of sequences of excitation samples is the most acceptable sequence of excitation samples in complying with a predetermined error criterion.

2. A system as claimed in claim 1, characterized in that the system comprises further decomposing means for decomposing the sequence of digitized signal samples into orthogonal component sequences if the orthogonal component sequences from the decomposing means are derived from the filtered sequences of excitation samples or for decomposing the filtered sequences of excitation sequences into orthogonal component sequences if the orthogonal component sequences from the decomposing means are derived from the sequence of digitized signal samples.

3. A system as claimed in claim 1, characterized in that the system comprises storage means for storing filtered sequences.

4. A system as claimed in claim 3, characterized in that the system comprises further decomposing means for decomposing the sequence of digitized signal samples into orthogonal component sequences if the orthogonal component sequences from the decomposing means are derived from the filtered sequences of excitation samples or for decomposing the filtered sequences of excitation sequences into orthogonal component sequences if the orthogonal component sequences from the decomposing means are derived from the sequence of digitized samples.

5. An analog signal coding system comprising:

sampling and digitizing means for obtaining digitized signal samples, a master codebook containing a plurality of sequences of excitation signal samples, and filtering means for deriving filtered sequences of excitation signal samples from the master codebook, characterized in that the analog signal coding system comprises:

decomposing means for decomposing the filtered sequences of excitation signal samples into a number of mutually orthogonal component sequences, means for forming at least two slave codebooks by storing for the plurality of sequences of excitation samples the corresponding orthogonal component sequences in the slave codebooks, at least two comparing means each for comparing a sequence of digitized signal samples and the mutually orthogonal component sequences stored in the respective slave codebooks to provide difference signals, and means for determining from the difference signals which sequence of the plurality of sequences of excitation samples is the most acceptable sequence of excitation samples in complying with a predetermined error criterion.

6. An analog signal coding method comprising:

sampling and digitizing an analog signal to obtain digitized signal samples, and deriving filtered sequences of excitation signal samples from a master codebook containing a plurality of sequences of excitation signal samples, characterized in that the analog signal coding method further comprises:

decomposing either a sequence of digitized signal samples or one of the filtered sequences of excitation signal samples into a number of mutually orthogonal component sequences, comparing mutually orthogonal component sequences with a sequence of digitized signal samples to provide difference signals if the orthogonal component sequences are derived from the filtered sequences of excitation signal samples, and comparing mutually orthogonal component sequences with the filtered sequences of excitation signal samples to provide difference signals if the orthogonal component sequences are derived from the sequence of digitized signal samples, and determining from the difference signals which sequence of the plurality of sequences of excitation samples is the most acceptable sequence of excitation samples in complying with a predetermined error criterion.

7. A method as claimed in claim 6, characterized in that the filtered sequences are decomposed into orthogonal component sequences, and further comprising the step of storing sets of these mutually orthogonal component sequences separately.

8. A method as claimed in claim 6, characterized in that half length filtered sequences are compared with half length sequences of the digitized signal.

9. A method as claimed in claim 8, characterized in that the filtered sequences are decomposed into orthogonal component sequences, and further comprising the step of storing sets of these mutually orthogonal component sequences separately.

10. An analog signal coding method comprising:

sampling and digitizing an analog signal to obtain digitized signal samples, and deriving filtered sequences of excitation signal samples from a master codebook containing a plurality of sequences of excitation signal samples, characterized in that the analog signal coding method further comprises:

decomposing the filtered sequences of excitation signal samples into mutually orthogonal component sequences, forming at least two slave codebooks by storing for the plurality of sequences of excitation samples the corresponding orthogonal component sequences in the slave codebooks, comparing a sequence of digitized signal samples and the mutually orthogonal component sequences stored in the respective slave codebooks to provide difference signals, and determining from the difference signals which sequence of the plurality of sequences of excitation samples is the most acceptable sequence of excitation samples in complying with a predetermined error criterion.

11. A decoding system for obtaining an analog signal, comprising:

a master codebook containing a plurality of sequences of excitation signal samples, and filtering means for deriving filtered sequences of excitation signal samples from the master codebook, characterized in that the decoding system further comprises:

decomposing means for decomposing the filtered sequences of excitation signal samples into sets of mutually orthogonal component sequences, means for obtaining a combined sequence by forming a weighted sum of the mutually orthogonal component sequences in response to an incoming coded signal, and means for transforming the combined sequence into an analog signal to provide a synthesized replica of a previously coded analog signal.

12. A decoding method for obtaining an analog signal, comprising deriving, from a master codebook containing a plurality of sequences of excitation samples, filtered sequences of said excitation samples, characterized in that the decoding method further comprises:

decomposing the filtered sequences of excitation samples into sets of mutually orthogonal component sequences, obtaining a combined sequence by forming a weighted sum of digitized signal samples to provide difference signals of the mutually orthogonal component sequences in response to an incoming signal, and transforming the combined sequence into an analog signal to provide a synthesized replica of a previously coded analog signal.

* * * * *